United States Patent [19]
Okazoe et al.

[11] Patent Number: 5,762,883
[45] Date of Patent: Jun. 9, 1998

[54] WET FLUE GAS DESULFURIZATION APPARATUS

[75] Inventors: Kiyoshi Okazoe; Eiji Ochi, both of Tokyo; Toru Takashina; Susumu Okino, both of Hiroshima-ken, all of Japan

[73] Assignee: Mitsubishi Jukogyo Kabushiki Kaisha, Tokyo, Japan

[21] Appl. No.: 665,943

[22] Filed: Jun. 19, 1996

[30] Foreign Application Priority Data

Aug. 3, 1995 [JP] Japan .................. 7-198491

[51] Int. Cl.$^6$ .................. B01D 53/34
[52] U.S. Cl. .................. 422/168; 422/169; 422/170; 422/171; 422/172; 422/224; 422/225; 422/234; 55/228; 55/229; 55/247
[58] Field of Search .................. 422/171, 169, 422/172, 108, 107, 168, 224–225, 234, 170; 423/243.08, 243.01, 242.1, 555; 55/228, 229, 247

[56] References Cited

U.S. PATENT DOCUMENTS 4,696,804  9/1987  Shinoda et al. .................. 423/555

FOREIGN PATENT DOCUMENTS

| 0 162 536 | 2/1984 | European Pat. Off. |
| 4331415 A1 | 9/1993 | Germany. |
| 6-41828 | 6/1994 | Japan. |
| 06277445 | 10/1994 | Japan. |

OTHER PUBLICATIONS

Patent Abstracts of Japan, vol. 016, No. 234 (C–0945)—JP 04 048916.

*Primary Examiner*—Hien Tran
*Attorney, Agent, or Firm*—Bell Seltzer Intellectual Property Law Group Alston & Bird LLP

[57] ABSTRACT

This invention relates to a wet flue gas desulfurization apparatus including: an absorption tower having defined in the lower part thereof a tank for holding a calcium compound-containing slurry fed thereto; a circulating pump for delivering the slurry within the tank to the upper part of the absorption tower in order to bring it into contact with flue gas; air supply member for supplying air to the tank for purposes of oxidation; a withdrawal pump for withdrawing the slurry within the tank in order to recover gypsum formed as a by-product or discharge waste water; falling slurry withdrawal member for withdrawing part of the slurry delivered to the upper part of the absorption tower by the circulating pump and falling through the absorption tower at a position above the liquid surface of the tank; and mixing member for the slurry withdrawn by the falling slurry withdrawal member with the slurry withdrawn from the tank by the withdrawal pump, whereby oxidizing substances produced in the tank of the absorption tower can be decreased by reduction.

4 Claims, 3 Drawing Sheets

FIG. I

WET FLUE GAS DESULFURIZATION APPARATUS

BACKGROUND OF THE INVENTION

1. Field of the Invention

This invention relates to a wet flue gas desulfurization apparatus wherein oxidizing substances produced in the tank of the absorption tower can be decreased in amount by their reduction.

2. Description of the Related Art

In recent years, wet flue gas desulfurization apparatus of the so-called in-situ oxidation type have become popular. In these apparatus, the necessity of an oxidation tower is eliminated by supplying air to a tank located in an absorption tower where an absorbent slurry [i.e., a slurry containing a calcium compound (typically limestone)] having sulfur dioxide absorbed therein is oxidized by contact with air.

FIG. 3 is a schematic view illustrating an example of a wet flue gas desulfurization apparatus of the in-situ oxidation type. This apparatus is equipped with a stirring rod 4 disposed within a tank 2 of an absorption tower 1, supported by a hollow shaft 3, and rotated horizontally by a motor (not shown); air supply pipes 5 extending from hollow shaft 3 and having their open ends 5a below stirring rod 4; and a rotary joint 6 for connecting the proximal end of hollow shaft 3 to an air source. By rotating hollow shaft 3 while supplying air C under pressure, air C is supplied from air supply pipes 5 to gas-phase areas created on the back side of the rotating stirring rod 4 and the tail ends of these gas-phase areas are subjected to a scattering action exerted by vortex forces resulting from the rotation of stirring rod 4. Thus, a large number of substantially uniform fine air bubbles are produced, so that the slurry having sulfur dioxide absorbed therein comes into efficient contact with air within tank 2 and thereby completely oxidized to form gypsum as a by-product.

In this apparatus, untreated flue gas A is introduced into a flue gas inlet section 1a of absorption tower 1 and brought into contact with liquid columns of an absorbent slurry injected upward from a plurality of nozzles 8a of a spray pipe 8 by means of a circulating pump 7 to absorb and remove sulfur dioxide present in untreated flue gas A. The resulting flue gas is discharged as treated flue gas B from a flue gas outlet section 1b. The slurry injected from spray pipe 8 flows downward while absorbing sulfur dioxide, and enters tank 2 where it is oxidized by contact with a large number of air bubbles produced by the above-described scattering action while being stirred with stirring rod 4, and then undergoes a neutralization reaction to form gypsum.

The absorbent slurry spouted upward from the nozzles 8a of spray pipe 8 scatters at its peak and begins to fall. The falling slurry and the spouted slurry come into mutual collision to form fine droplets. Thus, fine droplets of the slurry are formed in sequence, distributed throughout the absorption tower, and then fall slowly. Since flue gas containing sulfur dioxide flows downward through the absorption tower in which the slurry is present in the form of fine droplets, a large gas-liquid contact area per unit volume is achieved. Moreover, since the flue gas is effectively entangled in the streams of the spouted slurry in the vicinity of nozzles 8a, the flue gas is effectively mixed with the slurry, causing sulfur dioxide present in the flue gas to be efficiently absorbed into the slurry. The predominant reactions occurring in the course of these treatments are represented by the following reaction formulas (1) to (3).

(Absorption tower)

$$SO_2+H_2O \rightarrow H^+ +HSO_3^- \tag{1}$$

(Tank)

$$H^+ +HSO_3^- +1/2O_2 \rightarrow 2H^+ +SO_4^{2-} \tag{2}$$

$$2H^+ +SO_4^{2-} +CaCO_3+H_2O \rightarrow CaSO_4 \cdot 2H_2O+CO_2 \tag{3}$$

Thus, the slurry within tank 2 comes to have suspended or dissolved therein gypsum and a small amount of limestone used as absorbent. This slurry is withdrawn by means of a withdrawal pump 10 and fed to a solid-liquid separator 11 where it is filtered and recovered as gypsum D having a low water content (usually of about 10%). On the other hand, the filtrate from solid-liquid separator 11 is transferred to a filtrate tank 12 where make-up water E is added thereto.

The liquid within filtrate tank 12 (consisting essentially of water) is sucked out by means of a pump 13, and part of it is transferred to a waste water treating apparatus (not shown). The remainder is transferred to a slurry tank 14 where an absorbent F [i.e., limestone ($CaCO_3$)] is added thereto. The resulting absorbent slurry is sucked out by means of a slurry pump 15 and recycled to tank 2.

The waste water treating apparatus is an apparatus for removing impurities and harmful materials from the circulating water (i.e., the water cyclically used in the desulfurization apparatus) with the aid of an adsorbent resin or the like, and discharging the treated water to the outside or returning it to the desulfurization apparatus as make-up water E.

On the other hand, the pipeline for returning part of the slurry withdrawn by withdrawal pump 10 to tank 2 is provided with a pH sensor 16. The pH of the slurry within tank 2 is detected by this pH sensor 16 and the amount of absorbent added is suitably regulated by a pH controller 16a, so that the pH of the slurry within tank 2 can be adjusted to its optimum value taking absorption efficiency and oxidation efficiency into consideration.

In the above-described conventional wet flue gas desulfurization apparatus, the slurry having fallen through the absorption tower is forcedly oxidized by blowing air into tank 2. However, this has the disadvantage that the slurry may be overoxidized to produce oxidizing substances which are responsible for deterioration of the adsorbent resin or the like used in the waste water treating apparatus. Moreover, this has the additional disadvantage that, if the slurry is withdrawn in an overoxidized state, manganese scale may deposit on and adhere to the electrodes of pH sensor 16. As a result, long-term use in that state will cause a reduction in the accuracy of indication, or periodic cleaning operations will be required to prevent a reduction in accuracy.

Known countermeasures to overcome these disadvantages comprise techniques for controlling the amount of forced oxidation (or the concentration of unoxidized sulfurous acid) in the tank of the absorption tower so as to prevent the occurrence of oxidizing substances in the slurry, as disclosed, for example, in Japanese Patent Provisional Publication No. 6-277445 and Japanese Utility Model Provisional Publication 6-41828.

More specifically, according the technique disclosed in Japanese Patent Provisional Publication No. 6-277445, the tank of the absorption tower is divided by a partition into an aerated region and a non-aerated region, and the slurry in the non-aerated region is introduced into the slurry in the aerated region through a space left under the partition. Thus, the occurrence of oxidizing substances is suppressed by utilizing sulfurous acid remaining in the non-aerated region to reduce oxidizing substances present in the aerated region (i.e., by causing sulfurous acid to remain in the slurry within the tank of the absorption tower). According the technique disclosed in Japanese Utility Model Provisional Publication No. 6-41828, the occurrence of oxidizing substances is suppressed by regulating the feed rate of oxygen supplied to the tank of the absorption tower so as to vary the concentration of sulfurous acid.

In either of the above-described techniques, however, only the amount of forced oxidation in the tank is controlled. Consequently, when the apparatus is operated at a relatively low load, i.e., when the amount of sulfur oxides (in particular, sulfur dioxide) present in untreated flue gas A is small, the slurry is completely oxidized, or even overoxidized, by in-tower oxidation (i.e., the oxidation effected by $O_2$ in the flue gas in the gas-liquid contact area) and the so-called waterfall basin oxidation (i.e., the oxidation effected when the falling slurry collides with the liquid surface of the tank). This makes it impossible to control the concentration of sulfurous acid present in the tank, so that the occurrence of oxidizing substances cannot be prevented.

Since in-tower oxidation and waterfall basin oxidation (the combination of them will hereinafter be referred to as "natural oxidation") depend on the delivery rate of circulating pump 7, it is considered that, when the load is low, the amount of natural oxidation can be reduced by controlling circulating pump 7 so as to decrease its delivery rate. Thus, the occurrence of oxidizing substances can be prevented even at low loads. However, if the delivery rate of circulating pump 7 is unduly low, the absorbent slurry injected from a plurality of nozzles 8a of spray pipe 8 will not fully spread across absorption tower 1 (i.e., throughout its horizontal cross section). As a result, some flue gas will pass through absorption tower 1 without coming into contact with the absorbent slurry and leave absorption tower 1 without being freed of sulfur oxides. For this reason, there is a limit beyond which the occurrence of oxidizing substances at low loads cannot be prevented by controlling the delivery rate of circulating pump 7.

Moreover, in the conventional flue gas desulfurization apparatus, the slurry dripping from the corner at which the sidewall of absorption tower 1 is bent toward flue gas outlet section 1b (i.e., the part represented by reference numeral 17 in FIG. 2) tends to be formed into mist under the action of the wind force exerted by the flue gas. Accordingly, a mist eliminator having a relatively great capacity needs to be installed in flue gas outlet section 1b. Unless the formation of mist from the slurry is controlled properly, the corrosion of downstream equipment (e.g., gas-gas heaters) will be increased and the efficient recovery of water will not be achieved.

SUMMARY OF THE INVENTION

Accordingly, it is an object of the present invention to provide a wet flue gas desulfurization apparatus wherein oxidizing substances present in the slurry withdrawn from the tank can be sufficiently decreased even at low loads and, moreover, mist formation from the slurry is minimized.

As a result of intensive investigations conducted in order to accomplish the above object, the present inventors have now found that the amount of the so-called waterfall basin oxidation is greater than the amount of in-tower oxidation and sulfurous acid is not completely oxidized by in-tower oxidation alone under most operating conditions (even when the load is extremely low). On the basis of this finding, the present invention having the following characteristics have been completed.

According to a first mode of the present invention, there is provided a wet flue gas desulfurization apparatus of the in-situ oxidation type comprising: an absorption tower having in the lower part thereof a tank for holding a calcium compound-containing slurry fed thereto; a circulating pump for delivering the slurry within the tank to the upper part of the absorption tower in order to bring it into contact with flue gas; air supply means for supplying air to the tank for purposes of oxidation; a withdrawal pump for withdrawing the slurry within the tank in order to recover gypsum formed as a by-product or discharge waste water; falling slurry withdrawal means for withdrawing part of the slurry delivered to the upper part of the absorption tower by means of the circulating pump and falling through the absorption tower at a position above the liquid surface of the tank; and mixing means for the slurry withdrawn by the falling slurry withdrawal means with the slurry withdrawn from the tank by the withdrawal pump.

According to a second mode of the present invention, in the above-described wet flue gas desulfurization apparatus in accordance with the first mode of the present invention, the falling slurry withdrawal means comprises a slurry receiver installed on the inner surface of the sidewall of the absorption tower, and a falling slurry discharge pipe for discharging the slurry falling through the absorption tower and received by the slurry receiver to the outside of the absorption tower.

According to a third mode of the present invention, there is provided a wet flue gas desulfurization apparatus of the in-situ oxidation type comprising: an absorption tower having in the lower part thereof a tank for holding a calcium compound-containing slurry fed thereto; a circulating pump for delivering the slurry within the tank to the upper part of the absorption tower in order to bring it into contact with flue gas; air supply means for supplying air to the tank for purposes of oxidation; a withdrawal pump for withdrawing the slurry within the tank in order to recover gypsum formed as a by-product or discharge waste water; and falling slurry introduction means for receiving part of the slurry delivered to the upper part of the absorption tower by means of the circulating pump and falling through the absorption tower at a position above the liquid surface of the tank, and introducing it into the slurry within the tank at a position below the liquid surface of the tank.

According to a fourth mode of the present invention, in the above-described wet flue gas desulfurization apparatus in accordance with the third mode of the present invention, the falling slurry introduction means comprises a slurry receiver installed on the inner surface of the sidewall of the absorption tower, and a falling slurry introduction pipe for introducing the slurry falling through the absorption tower and received by the slurry receiver into the slurry within the tank at a position below the liquid surface of the tank.

According to a fifth mode of the present invention, in the above-described wet flue gas desulfurization apparatus in accordance with the third or fourth mode of the present invention, the position at which the slurry received by the slurry receiver is introduced into the slurry below the liquid surface of the tank by the falling slurry introduction means is determined so as to lie in a non-oxidizing region where the air supplied by the air supply means is not effectively distributed.

In the wet flue gas desulfurization apparatus in accordance with the first mode of the present invention, part of the slurry before reaching the liquid surface of the tank is collected by the falling slurry withdrawal means and then mixed with the slurry withdrawn from the tank by the mixing means. Since the slurry before entering the tank has undergone only in-tower oxidation and has scarcely been oxidized, the mixed slurry necessarily contains sulfurous acid and serves to reduce oxidizing substances present in the slurry withdrawn from the tank. Consequently, even when the load is so low that the occurrence of a large amount of oxidizing substances in the withdrawn slurry cannot be prevented solely by controlling the amount of forced oxidation within the tank, the amount of oxidizing substances contained in the waste water can be sufficiently decreased.

In the wet flue gas desulfurization apparatus in accordance with the second mode of the present invention, part of the slurry before entering the tank is received by the slurry receiver disposed on the inner surface of the sidewall of the absorption tower and then discharged to the outside of the absorption tower through the falling slurry discharge pipe. Consequently, part of the falling slurry can be withdrawn without interfering with the flow of flue gas. Moreover, no slurry drips from the above-described corner, so that mist formation from the slurry is suppressed.

In the wet flue gas desulfurization apparatus in accordance with the third mode of the present invention, part of the slurry before entering the tank is collected by the falling slurry introduction means and then introduced into the slurry within the tank at a position below the liquid surface of the tank. That is, the slurry before entering the tank is introduced into the tank without being oxidized by waterfall basin oxidation. Since the slurry before entering the tank has undergone only in-tower oxidation and has scarcely been oxidized, this slurry necessarily contains sulfurous acid and serves to reduce oxidizing substances present in the slurry within the tank. Consequently, even when the load is so low that the occurrence of a large amount of oxidizing substances in the withdrawn slurry cannot be prevented solely by controlling the amount of forced oxidation within the tank, the amount of oxidizing substances contained in the waste water can be sufficiently decreased.

In the wet flue gas desulfurization apparatus in accordance with the fourth mode of the present invention, part of the slurry before entering the tank is received by the slurry receiver disposed on the inner surface of the sidewall of the absorption tower and then introduced into the slurry within the tank at a position below the liquid surface of the tank. Consequently, part of the falling slurry can be withdrawn without interfering with the flow of flue gas. Moreover, no slurry drips from the above-described corner, so that mist formation from the slurry is suppressed.

In the wet flue gas desulfurization apparatus in accordance with the fifth mode of the present invention, the position at which the slurry is introduced into the slurry below the liquid surface of the tank by the falling slurry introduction means is determined so as to lie in a non-oxidizing region where the air supplied by the air supply means is not effectively distributed. Consequently, it is avoided that the slurry introduced by the falling slurry introduction means comes into contact with the air supplied by the air supply means and the sulfurous acid present in this slurry hence disappears within the tank. That is, if the falling slurry is introduced into an oxidizing region, the sulfurous acid present in this slurry may be oxidized before inducing the reduction reactions of oxidizing substances present in the tank, depending on the feed rate of air supplied by the air supply means. As a result, the sulfurous acid may fail to contribute to the decrease of oxidizing substances. In this apparatus, however, the sulfurous acid present in the introduced falling slurry surely induces the reduction reactions of oxidizing substances present in the tank.

Thus, according to the present invention, part of the slurry falling through the absorption tower and containing residual sulfurous acid is collected and brought into contact with the slurry within the tank of the absorption tower to reduce oxidizing substances produced in the slurry within the tank by the sulfurous acid, so that the adsorbent resin or the like used in the waste water treating apparatus can be prevented from being deteriorated by such oxidizing substances. In addition, manganese scale scarcely deposits on the electrodes of the pH sensor, so that the accuracy of the pH sensor can be kept high without requiring periodic cleaning operations.

Moreover, when the falling slurry withdrawal means or the falling slurry introduction means comprises a slurry receiver disposed on the inner surface of the sidewall of the absorption tower and a pipe connected thereto (i.e., the falling slurry discharge pipe or the falling slurry introduction pipe), the flow of flue gas is not interfered with and mist formation from the slurry can be suppressed.

Furthermore, when the position at which the slurry is introduced into the slurry below the liquid surface of the tank by the falling slurry introduction means is determined so as to lie in a non-oxidizing region where the air supplied by the air supply means is not effectively distributed, it is avoided that the slurry introduced by the falling slurry introduction means comes into contact with the air supplied by the air supply means and the sulfurous acid present in this slurry hence disappears within the tank. Consequently, the sulfurous acid present in the introduced falling slurry surely induces the reduction reactions of oxidizing substances present in the tank regardless of the feed rate of air supplied by the air supply means, so that the effect of preventing deterioration of the adsorbent resin or the like used in the waste water treating apparatus can be achieved with higher certainty.

DETAILED DESCRIPTION OF PREFERRED EMBODIMENTS (First Embodiment)

Figure 3:
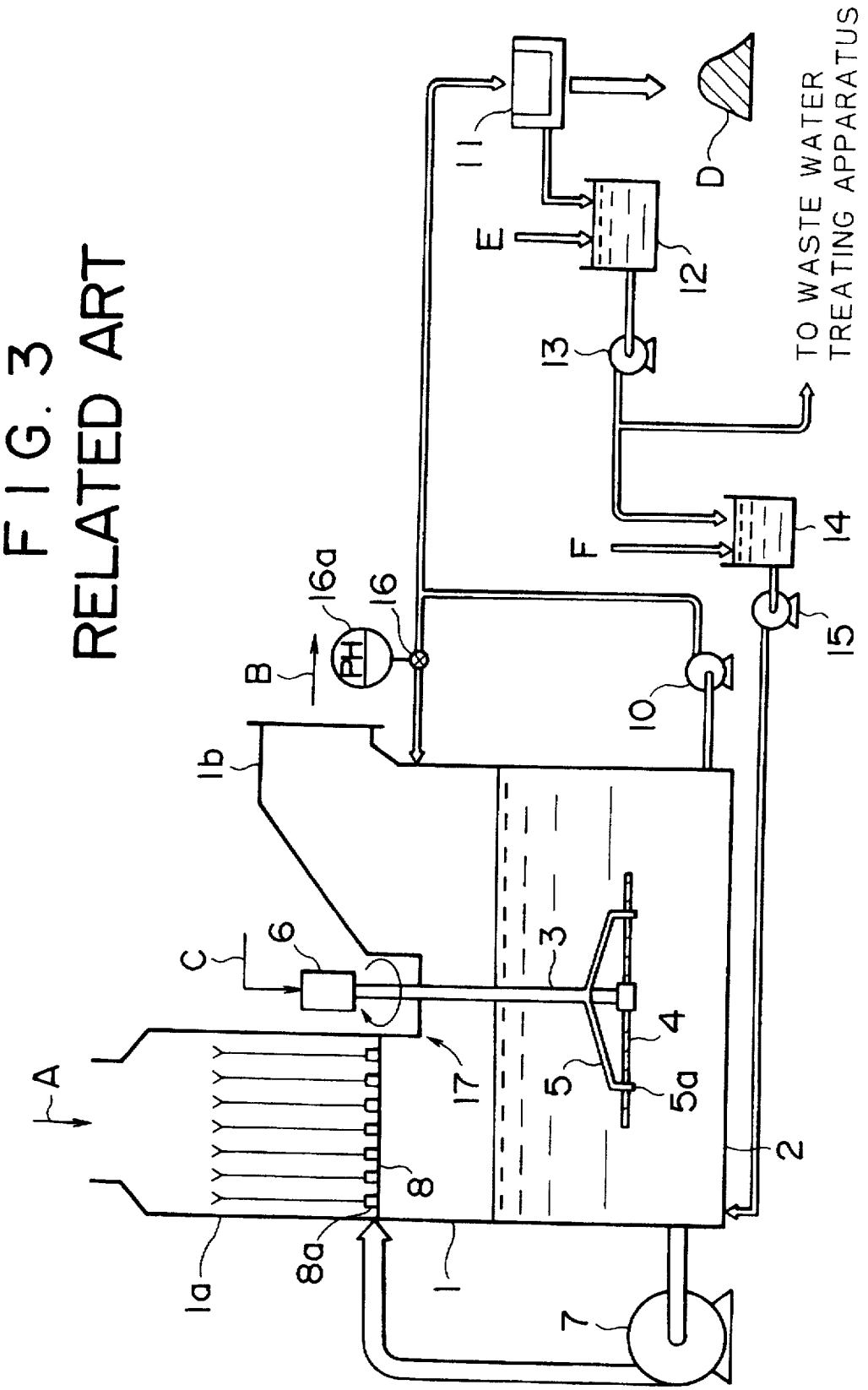
FIG. 3 is a schematic view illustrating the overall construction of an example of a conventional wet flue gas desulfurization apparatus.

One embodiment of the wet flue gas desulfurization apparatus in accordance with the first and second modes of the present invention is described hereinbelow with reference to FIG. 1. In the following description, the same elements as mentioned above in connection with the conventional wet flue gas desulfurization apparatus illustrated in FIG. 3 are designated by the same reference numerals, and the explanation thereof is omitted.

Figure 1:
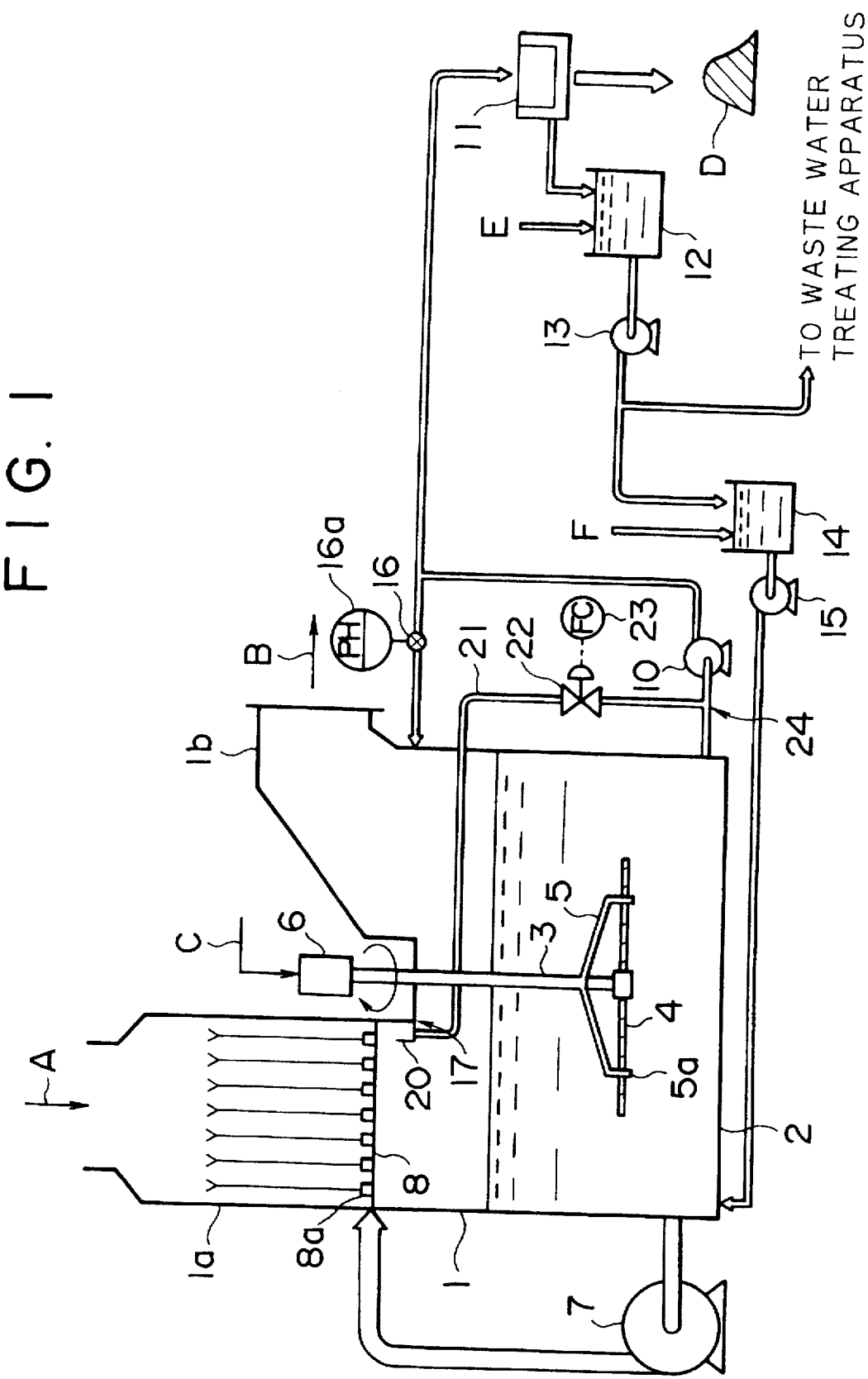
FIG. 1 is a schematic view illustrating the overall construction of a wet flue gas desulfurization apparatus in accordance with a first embodiment of the present invention.

As illustrated in FIG. 1, the wet flue gas desulfurization apparatus in accordance with this embodiment is provided with a gutter-like slurry receiver 20 disposed on the inner surface of the sidewall of absorption tower 1 on its flue gas outlet side, a falling slurry discharge pipe 21 for connecting this slurry receiver 20 to the slurry suction side of a withdrawal pump 10, a flow control valve 22 for regulating the flow rate of the slurry passing through this falling slurry discharge pipe 21, and a flow controller 23 for controlling the opening of this flow control valve 22 as will be described later.

In FIG. 1, slurry receiver 20 is installed at the corner 17 where the sidewall of absorption tower 1 is bent toward flue gas outlet section 1b. However, slurry receiver 20 may be installed at any position that enables some of the falling slurry to be collected above the liquid surface of tank 2, i.e., at any position that enables some of the falling slurry to be collected before it reaches the liquid surface of tank 2. Moreover, slurry receiver 20 need not necessarily be installed on the sidewall on only one side of absorption tower 1, but may be installed, for example, all along its perimeter.

In this case, the falling slurry withdrawal means of the present invention comprises slurry receiver 20 and falling slurry discharge pipe 21, and the mixing means of the present invention comprises the suction pipe of withdrawal pump 10 and the joint (or junction) 24 of falling slurry discharge pipe 21.

In this case, the slurry received by slurry receiver 20 has scarcely been oxidized in absorption tower 1 and necessarily contains residual sulfurous acid. This slurry containing residual sulfurous acid is conducted through falling slurry discharge pipe 21, supplied at joint 24 to the slurry suction side of withdrawal pump 10, and mixed with the slurry withdrawn from tank 2. Consequently, even if oxidizing substances are contained in the slurry withdrawn from tank 2 by means of withdrawal pump 10, these oxidizing substances are reduced and neutralized by sulfurous acid. This reduction is almost completely carried out in a pipeline extending from withdrawal pump 10 to a solid-liquid separator 11 and within a tank 12 having a sufficient residence time, so that the liquid transferred to a waste water treating apparatus or a slurry tank 14 contains no oxidizing substances.

Especially in this embodiment, since the so-called liquid column type is employed as the design (or the mode of gas-liquid contact) of absorption tower 1, the amount of in-tower oxidation is smaller. As a result, even when the concentration of sulfur dioxide in flue gas is extremely low, the slurry received by slurry receiver 20 contains a relatively large amount of sulfurous acid and is hence adequate for the above-described neutralization of oxidizing substances.

Table 1 shows the results of trial calculations in the case where flue gas (having a sulfur dioxide concentration of 200 ppm) from low $SO_x$ coal-fired boilers used in an electric power plant of the 1,000 MW class is treated by the desulfurization apparatus in accordance with this embodiment.

As the load becomes lower, the natural oxidation capacity (i.e., the sum of the in-tower oxidation capacity and the waterfall basin oxidation capacity) increases. When the boiler load is 50% or less, the required oxidation capacity of the tank has a negative value, indicating that peroxides are formed in the tank as a result of overoxidation. Even under these circumstances, the $SO_3$ concentration in the lower portion of the circulating liquid is 0.22 or 0.09 mmol/liter, indicating that $SO_3$ remains in the slurry received by slurry receiver 20. Accordingly, the peroxides can be reduced by mixing this slurry with the slurry withdrawn from tank 2.

TABLE 1

| Boiler load | 100% | 75% | 50% | 30% |
|---|---|---|---|---|
| Circulation flow rate through absorption tower (m³/h) | 20,000 | 20,000 | 20,000 | 20,000 |
| Amount of $SO_2$ absorbed (kg mol/h) | 17.7 | 14.2 | 10.7 | 7.2 |
| In-tower oxidation capacity (kg mol/h) | 4.1 | 4.9 | 6.3 | 5.4 |
| Waterfall basin oxidation capacity (kg mol/h) | 5.4 | 7.0 | 9.1 | 10.9 |
| Natural oxidation capacity (kg mol/h) | 9.5 | 11.9 | 15.4 | 16.3 |
| Required oxidation capacity of tank (kg mol/h) | 8.2 | 2.3 | −4.7 (Formation of peroxides) | 0.2 (Same as left) |
| Concentration of $SO_3$ in lower portion of circulating liquid (mmol/liter) | 0.68 | 0.47 | 0.22 | 0.09 |

Flow controller 23 opens flow control valve 22 wide when the apparatus is operated at a low load (i.e., the concentration of sulfur dioxide in untreated flue gas A is low), and maintains flow control valve 22 in a slightly opened or fully closed state when the apparatus is operated at a high load (i.e., the concentration of sulfur dioxide in untreated flue gas A is high). That is, when the load is low, the slurry is almost completely oxidized by waterfall basin oxidation even if the amount of air blown into tank 2 is reduced to zero. Consequently, it is necessary to mix a large amount of the slurry containing residual sulfurous acid. In this case, flow control valve 22 should be opened as wide as the oxidizing substances can be reduced completely. In contrast, when the load is high, the slurry is not completely oxidized, and in-tank forced oxidation is also carried out. If a large amount of the slurry containing residual sulfurous acid is mixed in this case, the concentration of sulfurous acid will become excessively high. The presence of such excess sulfurous acid in gypsum will reduce its purity (i.e., will deteriorate the quality of gypsum obtained as a by-product). Accordingly, when the load is high, the opening of flow control valve 22 is reduced according to the magnitude of the load. In a typical case, flow control valve 22 is usually closed because the apparatus is operated at a relatively high load, and opened only when the load is reduced considerably.

It is to be understood that the present invention may be practiced in such a way as to operate flow control valve 22 manually instead of resorting to flow controller 23. In this case, flow control valve 22 may be controlled, for example, in such a way that its opening is preset so as to give a flow rate required at low loads and flow control valve 22 is closed only when an increase in load makes it unsuitable to maintain its opening (e.g., when the purity of gypsum has fallen below its permissible level as described above). Alternatively, instead of using flow control valve 22, the flow rate may be preset on the basis of pipe resistance.

On the other hand, as previously described in connection with the conventional wet flue gas desulfurization apparatus, a pH sensor 16 is used to measure the pH of the slurry within tank 2. Conventionally, this pH sensor 16 involves a problem in that manganese scale will deposit on its electrode and long-term use in that state will cause a reduction in the accuracy of indication. In order to solve this problem, it has been conventional practice to wash the electrodes of pH sensor 16 at predetermined intervals and thereby maintain its desired accuracy of indication. According to the present invention, the oxidizing substances are reduced by sulfurous acid present in the mixed slurry, so that the slurry in which the electrodes of pH sensor 16 are immersed is prevented from being brought into an overoxidized state and, therefore, essentially no manganese scale deposits on the electrodes thereof. Consequently, the necessity of periodic cleaning operations is eliminated and the accuracy of detection is kept high in spite of that.

Thus, in the apparatus of this embodiment, part of the slurry falling through absorption tower 1 and containing residual sulfurous acid is collected by slurry receiver 20 disposed on the inner surface of the sidewall of absorption tower 1 and, especially when the apparatus is operated at a low load, this slurry is conducted through falling slurry discharge pipe 21 and mixed with the slurry-withdrawn from tank 2 so that oxidizing substances produced in tank 2 may be reduced by the sulfurous acid.

Consequently, even if most of the falling slurry is oxidized by waterfall basin oxidation when the apparatus is operated at a low load, oxidizing substances produced in the slurry are reduced by the sulfurous acid remaining in the slurry collected before entering the tank. As a result, the resulting waste water always contains essentially no oxidizing substances and hence causes no deterioration of the adsorbent resin or the like used in the waste water treating apparatus.

Moreover, the slurry falling along the inner surface of the sidewall of absorption tower 1 is received by slurry receiver 20 disposed on the inner surface of the sidewall of absorption tower 1, so that no-slurry drips from the corner 17 at which the sidewall of absorption tower 1 is bent toward flue gas outlet section 1b. Consequently, the flow of flue gas in absorption tower 1 is not interfered with and mist formation from the slurry scarcely occurs, thus making it unnecessary to install a mist eliminator of great capacity. Furthermore, the deposition of manganese scale on the electrodes of pH sensor 16 is avoided, so that the accuracy of pH sensor 16 can be kept high without requiring periodic cleaning operations.

(Second Embodiment)

Next, one embodiment of the wet flue gas desulfurization apparatus in accordance with the third, fourth and fifth modes of the present invention is described hereinbelow with reference to FIG. 2. In the following description, the same elements as mentioned above in connection with the wet flue gas desulfurization apparatus in accordance with the first embodiment of illustrated in FIG. 1 are designated by the same reference numerals, and the explanation thereof is omitted.

Figure 2:
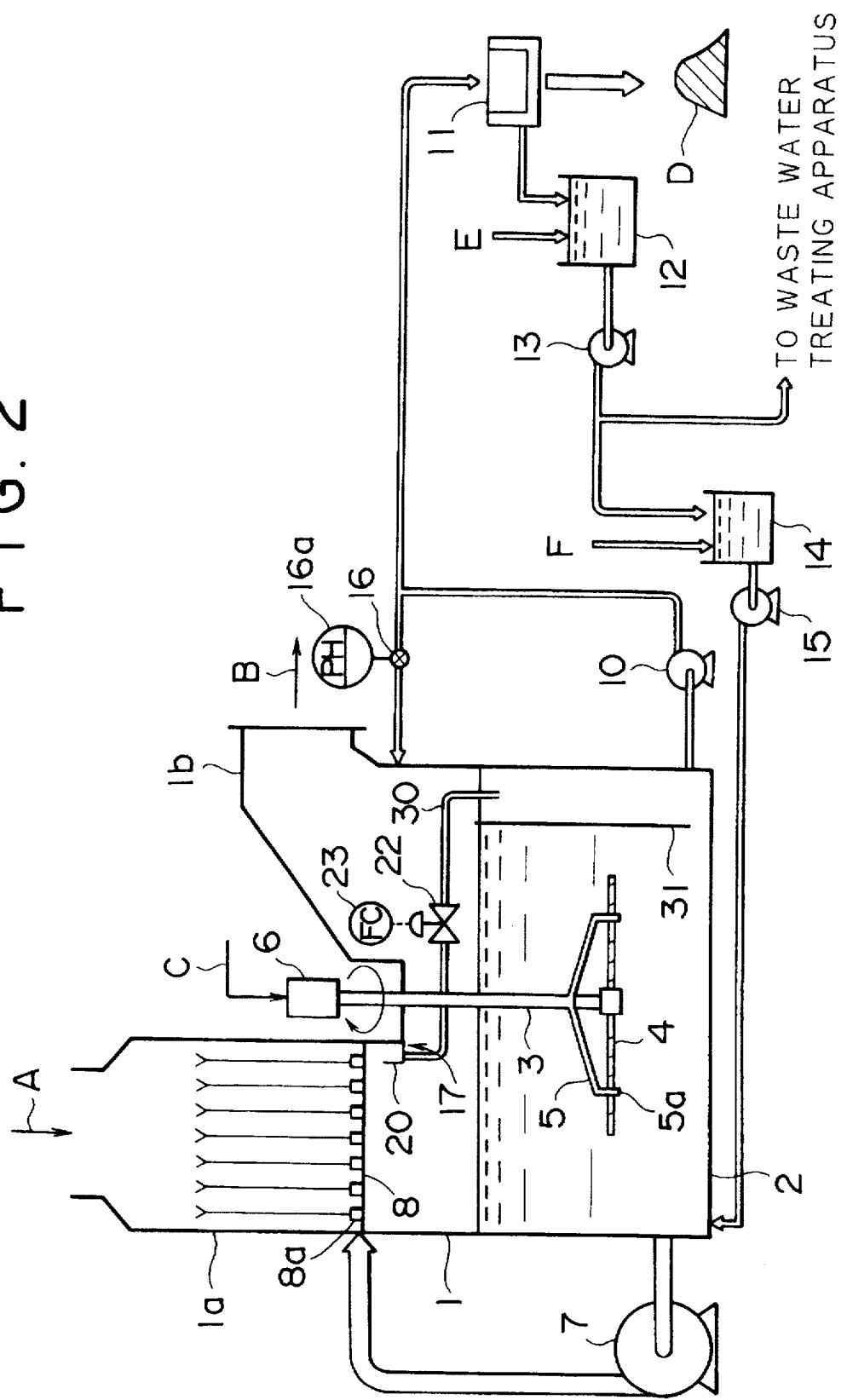
FIG. 2 is a schematic view illustrating the overall construction of a wet flue gas desulfurization apparatus in accordance with a second embodiment of the present invention.

As illustrated in FIG. 2, the wet flue gas desulfurization apparatus in accordance with this embodiment has a falling slurry introduction pipe 30 in place of falling slurry discharge pipe 21 used in the first embodiment. One end of this falling slurry introduction pipe 30 is connected to slurry receiver 20 disposed on the inner surface of the sidewall of absorption tower 1, while the other end thereof extends into a non-oxidizing region below the liquid surface of tank 2. As used herein, the term "non-oxidizing region" means a region where the air supplied by the air supply means is not effectively distributed. For example, when the air supply means comprises a rotating-arm air sparger as shown in FIG. 2, air is blown into and ascends through a cylindrical area having a diameter somewhat larger than the outer diameter of air supply pipes 5, and this area constitutes a region where forced oxidation is effectively carried out by gas-liquid contact with the blown air (i.e., an oxidizing region). The non-oxidizing region is a region outside this oxidizing region.

In FIG. 2, a partition wall 31 for partitioning tank 2 is installed so that the other end of falling slurry introduction pipe 30 will surely extend into a non-oxidizing region below the liquid surface of the tank. However, this partition wall 31 is not essential and may be installed as desired. Moreover, the other end of falling slurry introduction pipe 30 need not be precisely positioned below the surface of the slurry within tank 2, but may be positioned somewhat above the surface of the slurry within tank 2, provided that the slurry received by slurry receiver 20 and introduced through falling slurry introduction pipe 30 is not oxidized by waterfall basin oxidation. Thus, the term "below tie liquid surface" as used herein means any vertical position at which waterfall basin oxidation does not occur.

In this case, the falling slurry introduction means of the present invention comprises slurry receiver 20 and falling slurry introduction pipe 30.

In this embodiment, the slurry received by slurry receiver 20 has scarcely been oxidized in absorption tower 1 and necessarily contains residual sulfurous acid. This slurry containing residual sulfurous acid is introduced into tank 2 through falling slurry introduction pipe 30 without undergoing waterfall basin oxidation. Moreover, the use of partition wall 31 permits this slurry to be surely introduced into a non-oxidizing region isolated from an oxidizing region.

Consequently, even if the remainder of the falling slurry is oxidized by waterfall basin oxidation or forced oxidation to produce oxidizing substances in the slurry within tank 2, these oxidizing substances are reduced by reaction with sulfurous acid present in the slurry introduced through falling slurry introduction pipe 30. More specifically, when the slurry located in the oxidizing region (i.e., the slurry containing oxidizing substances) is passed to the suction side of -withdrawal pump 10 through a space left under the lower end of partition wall 31, it comes into contact with the slurry introduced through falling slurry introduction pipe 30. This reduction is almost completely carried out in a pipeline extending from withdrawal pump 10 to a solid-liquid separator 11 and within a tank 12 having a sufficient residence time, so that the liquid transferred to a waste water treating apparatus or a slurry tank 14 contains no oxidizing substances.

Thus, in the apparatus of this second embodiment, not only the same effects as described above in connection with the first embodiment can be achieved, but the amount of oxidizing substances can further be decreased because the reduction reactions thereof are also carried out within tank 2. Moreover, this apparatus has the unique advantage that falling slurry introduction pipe 30 has a length smaller than that of falling slurry withdrawal pipe 21 used in the first embodiment and need not be connected to the suction side of withdrawal pump 10, thus resulting in a corresponding simplification of the equipment.

In this embodiment, the position at which part of the falling slurry is introduced into the slurry below the liquid surface of the tank is determined so as to lie in a non-oxidizing region as described above. This produces the following effect.

Let us suppose that the falling slurry is introduced into the oxidizing region. If the feed rate of air supplied by the air supply means (i.e., the amount of forced oxidation) is not decreased in spite of an extreme drop in load (i.e., the amount of sulfur dioxide in flue gas), a large amount of oxidizing substances will be produced in the slurry within the tank. Moreover, sulfurous acid present in the falling slurry introduced through falling slurry introduction pipe 30 will be oxidized before inducing the reduction reactions of the oxidizing substances, thus failing to contribute to the decrease of oxidizing substances. However, when the position of introduction is determined as described above, sulfurous acid present in the introduced falling slurry can surely induce the reduction reactions of the oxidizing substances present in the tank even under such a situation.

Consequently, the amount of oxidizing substances present in the slurry is surely decreased regardless of the feed rate of air supplied by the air supply means, so that the effect of preventing deterioration of the adsorbent resin or the like used in the waste water treating apparatus can be achieved with higher certainty.

The present invention is not limited to the above-described embodiments, but may be practiced in various ways. For example, the mixing means of the present invention is not limited to the construction of the above-described first embodiment in which two pipes are connected so as to allow two streams of slurry to be joined together and thereby mixed. Alternatively, the mixing means may be constructed so that the falling slurry withdrawn from the main body of the absorption tower and the slurry withdrawn from the tank of the absorption tower are introduced into a mixing tank where they are mixed, and the resulting mixture is withdrawn by means of a pump and transferred to downstream equipment.

Moreover, as described above, slurry receiver 20 disposed on the inner surface of the sidewall of the absorption tower may be installed, for example, all along its perimeter, the use of flow controller 23 and flow control valve 22 may be eliminated, and partition wall 31 installed in the second embodiment may be omitted.

Furthermore, in the above-described embodiments, an absorption tower of the so-called liquid column type in which the absorbent slurry is injected upward in the form of liquid columns is employed to effect gas-liquid contact therein. However, the present invention is not limited thereto, but may employ, for example, an absorption tower of the so-called packed type (or grid type) in which the absorbent slurry is made to flow downward through a packing material disposed therein and thereby brought into contact with flue gas. Nevertheless, according to an investigation made by the present inventors, the liquid column type gives a smaller amount of in-tower oxidation than the packed type and the like, and hence has the feature that, even when the concentration of sulfur dioxide in flue gas is extremely low, a greater amount of residual sulfurous acid is present in the falling slurry as described above and can achieve the neutralization of peroxides more satisfactorily.

Furthermore, in the above-described embodiments, a rotating-arm air sparger as described previously is employed as the air supply means. However, the air supply means is not limited thereto, but may comprise, for example, a simple fixed pipe disposed within the tank of the absorption tower for blowing air into the tank.

We claim:

1. A wet flue gas desulfurization apparatus of an in-situ oxidation comprising:

an absorption tower having in a lower part thereof a tank for holding a calcium compound-containing slurry fed thereto;

a circulating pump for delivering the slurry within said tank to an upper part of said absorption tower in order to bring the slurry into contact with flue gas;

air supply means for supplying air to said tank for purposes of oxidation;

a withdrawal pump for withdrawing the slurry within said tank in order to recover gypsum formed as a by-product or discharge waste water;

falling slurry withdrawal means for withdrawing part of the slurry delivered to the upper part of said absorption tower by means of said circulating pump and falling through said absorption tower at a position above a liquid surface of said tank; and mixing means for mixing the slurry withdrawn by said falling slurry withdrawal means with the slurry withdrawn from said tank by said withdrawal pump.

2. A wet flue gas desulfurization apparatus as claimed in claim 1 wherein said falling slurry withdrawal means comprises a slurry receiver installed on an inner surface of a sidewall of said absorption tower, and a falling slurry discharge pipe for discharging the slurry falling through said absorption tower and received by said slurry receiver to an outside of said absorption tower.

3. A wet flue gas desulfurization apparatus of an in-situ oxidation comprising:

an absorption tower having in a lower part thereof a tank for holding a calcium compound-containing slurry fed thereto;

a circulating pump for delivering the slurry within said tank to an upper part of said absorption tower in order to bring the slurry into contact with flue gas;

air supply means for supplying air to said tank for purposes of oxidation;

a withdrawal pump for withdrawing the slurry within said tank in order to recover gypsum formed as a by-product or discharge waste water;

falling slurry introduction means for receiving part of the slurry delivered to the upper part of said absorption tower by means of said circulating pump and falling through said absorption tower at a position above a liquid surface of said tank, and introducing said part of the slurry into the slurry within said tank at a position below the liquid surface of said tank; and mixing means for mixing the slurry received by said falling slurry introduction means with the slurry withdrawn from said tank by said withdrawal pump;

wherein the position at which said part of the slurry is introduced into the slurry below the liquid surface of said tank by said falling slurry introduction means, is determined so as to lie in a non-oxidizing region where the air supplied by said air supply means is not effectively distributed.

4. A wet flue gas desulfurization apparatus as claimed in claim 3 wherein said falling slurry introduction means comprises a slurry receiver installed on an inner surface of a sidewall of said absorption tower, and a falling slurry introduction pipe for introducing the slurry falling through said absorption tower and received by said slurry receiver into the slurry within said tank at a position below the liquid surface of said tank.

* * * * *